United States Patent
Nguyen et al.

(10) Patent No.: US 11,292,920 B2
(45) Date of Patent: Apr. 5, 2022

(54) WATER REPELLANT SURFACE TREATMENT FOR AIRCRAFT TRANSPARENCIES AND METHODS OF TREATING AIRCRAFT TRANSPARENCIES

(71) Applicant: PPG INDUSTRIES OHIO, INC., Cleveland, OH (US)

(72) Inventors: Frank Nguyen, Garden Grove, CA (US); Tun-Min Maung, Culver City, CA (US); Alexander Bimanand, Burbank, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 434 days.

(21) Appl. No.: 15/178,095

(22) Filed: Jun. 9, 2016

(65) Prior Publication Data

US 2016/0362558 A1   Dec. 15, 2016

Related U.S. Application Data

(60) Provisional application No. 62/173,434, filed on Jun. 10, 2015.

(51) Int. Cl.
| | |
|---|---|
| *B05D 3/00* | (2006.01) |
| *C09D 5/00* | (2006.01) |
| *B64C 1/14* | (2006.01) |
| *C09D 183/08* | (2006.01) |
| *C03C 17/30* | (2006.01) |

(52) U.S. Cl.
CPC ............. *C09D 5/00* (2013.01); *B05D 3/007* (2013.01); *B64C 1/1484* (2013.01); *C03C 17/30* (2013.01); *C09D 183/08* (2013.01); *C03C 2217/76* (2013.01)

(58) Field of Classification Search
None
See application file for complete search history.

(56) References Cited

U.S. PATENT DOCUMENTS

| | | | |
|---|---|---|---|
| 4,746,347 | A | 5/1988 | Sensi |
| 4,792,536 | A | 12/1988 | Pecoraro et al. |
| 5,240,886 | A | 8/1993 | Gulotta et al. |
| 5,385,872 | A | 1/1995 | Gulotta et al. |

(Continued)

FOREIGN PATENT DOCUMENTS

| | | |
|---|---|---|
| CN | 1304437 A | 7/2001 |
| CN | 1738686 A | 2/2006 |

(Continued)

*Primary Examiner* — Shamim Ahmed
*Assistant Examiner* — Bradford M Gates
(74) *Attorney, Agent, or Firm* — Michael J. Grese (57) ABSTRACT

A method of treating an aircraft transparency includes applying a water repellant coating composition over a surface of an aircraft transparency substrate, the water repellant coating composition includes a non-chlorinated perfluoroalkylalkylsilane and/or a non-halogenated polyorganosiloxane. The method can include applying a primer composition having an organic solvent and a silicon material over the aircraft transparency substrate to form a primed substrate surface; applying the water repellant coating composition over the primed substrate surface; and heating the water repellant coating composition to form a water repellant coating.

20 Claims, 3 Drawing Sheets

(56) References Cited

U.S. PATENT DOCUMENTS

| | | | |
|---|---|---|---|
| 5,393,593 A | 2/1995 | Gulotta et al. | |
| 5,523,162 A | 6/1996 | Franz et al. | |
| 5,688,864 A | 11/1997 | Goodwin | |
| 5,707,740 A | 1/1998 | Goodwin | |
| 5,980,990 A | 11/1999 | Goodwin | |
| 6,025,025 A | 2/2000 | Bartrug et al. | |
| 6,461,537 B1* | 10/2002 | Turcotte | C03C 17/28 106/13 |
| 6,511,753 B1 | 1/2003 | Teranishi et al. | |
| 6,811,884 B2 | 11/2004 | Goodwin et al. | |
| 2004/0121168 A1* | 6/2004 | Goodwin | B05D 1/28 428/447 |
| 2005/0009953 A1* | 1/2005 | Shea | C08L 83/04 523/169 |
| 2011/0065620 A1* | 3/2011 | Owens | C09K 5/045 508/582 |
| 2012/0003427 A1* | 1/2012 | Kuroda | B32B 7/02 428/141 |
| 2012/0272999 A1* | 11/2012 | Kumon | H01L 21/02068 134/4 |
| 2012/0282458 A1* | 11/2012 | Takeda | C03C 17/3411 428/331 |
| 2013/0216820 A1* | 8/2013 | Riddle | C09D 4/00 428/313.9 |
| 2013/0220176 A1 | 8/2013 | Asanuma et al. | |
| 2014/0234543 A1 | 8/2014 | Ito et al. | |
| 2014/0309329 A1 | 10/2014 | Sawada et al. | |
| 2015/0086713 A1 | 3/2015 | Chen et al. | |
| 2015/0315443 A1 | 11/2015 | Takeda et al. | |

FOREIGN PATENT DOCUMENTS

| | | |
|---|---|---|
| JP | H7248205 A | 9/1995 |
| JP | 2006328624 A | 12/2006 |
| JP | 2009524709 A | 7/2009 |
| JP | 201424288 A | 2/2014 |
| JP | 2014522744 A | 9/2014 |
| JP | 2014205739 A | 10/2014 |
| WO | 2007085320 A2 | 8/2007 |
| WO | 2009121911 A1 | 10/2009 |
| WO | 2012063767 A1 | 5/2012 |
| WO | 2012173803 A1 | 12/2012 |
| WO | 2013061747 A1 | 5/2013 |
| WO | 2014126064 A1 | 8/2014 |

* cited by examiner

WATER REPELLANT SURFACE TREATMENT FOR AIRCRAFT TRANSPARENCIES AND METHODS OF TREATING AIRCRAFT TRANSPARENCIES

CROSS REFERENCE TO RELATED APPLICATION

This application claims priority to U.S. Provisional Patent Application No. 62/173,434, filed Jun. 10, 2015, which is herein incorporated by reference its entirety.

BACKGROUND OF THE INVENTION

Field of the Invention

This invention relates generally to water repellant coatings and, more particularly, to water repellant coatings for an aircraft transparency.
Technical Field Water repellant coatings are applied to the outer surface of aircraft windows and windshields to improve visibility, such as during rain, sleet, or snow. An exemplary group of water repellant coatings incorporates a perfluoroalkylalkylchlorosilane to provide hydrophobicity. The components of the water repellant coating are provided in two sealed ampules. The tips of the ampules are broken and the contents are mixed together. The resultant coating composition is wiped onto the outer surface of the aircraft transparency.

While perfluoroalkylalkylchlorosilane-containing water repellant coatings provide desirable water repellant, e.g., hydrophobic, properties, the use of perfluoroalkylalkylchlorosilane is becoming less popular worldwide due to environmental concerns. For example, chlorinated materials that are released into the atmosphere can contribute to ozone depletion. Further, chlorinated coatings can require the use of ventilation equipment during application. Chlorinated coatings can also require the implementation of hazardous waste handling procedures. Additionally, chlorinated coating components tend to react very rapidly with moisture, which can cause problems when applying a chlorinated coating composition onto an aircraft transparency in humid conditions. Additionally, the solvent for conventional chlorinated coating compositions typically is volatile, making the ampules difficult to seal.

Therefore, it would be desirable to provide a water repellant coating and/or treatment system that reduces or eliminates at least some of these problems while maintaining acceptable water repellant properties. For example, it would be desirable to provide a treatment system in which the water repellant coating is free of chlorine and/or bromine, or contains less chlorine and/or bromine than known coatings. This would reduce the problem of ozone depletion. For example, it would be desirable to provide a treatment system in which the components of the water repellant coating composition are not contained in ampules. For example, it would be desirable to provide a treatment system in which the applied water repellant coating composition optionally could be dried under ambient conditions, e.g., without the application of an external heat source.

A water repellant coating for aircraft transparencies having additional advantages could also be desirable. For example, while non-chlorinated perfluoroalkanes are not detrimental to the ozone layer, perfluoroalkanes do have relatively long atmospheric lifetimes. As such, they can act as greenhouse gasses due to infrared radiation absorption. Therefore, in a further example, it would be advantageous to provide a water repellant coating that is not only chlorine-free and/or bromine-free but is also fluorine-free. For example, the water repellant coating could be halogen-free.

SUMMARY OF THE INVENTION

A method of treating an aircraft transparency comprises applying a water repellant coating composition over a surface of an aircraft transparency substrate. The water repellant coating composition comprises at least one of a non-chlorinated perfluoroalkylalkylsilane and a non-halogenated polyorganosiloxane.

The method can include applying a primer composition comprising an organic solvent and a silicon material over the aircraft transparency substrate to form a primed substrate surface; applying the water repellant coating composition over the primed substrate surface; and heating the water repellant coating composition to form a water repellant coating.

A treatment system for an aircraft transparency comprises a water repellant coating composition comprising at least one of a non-chlorinated perfluoroalkylalkylsilane and a non-halogenated polyorganosiloxane.

Optionally, the treatment system can include a primer composition comprising an organic solvent and a silicon-containing material.

BRIEF DESCRIPTION OF THE DRAWINGS

The invention will be described with reference to the following drawing figures, which illustrate test results for Examples 1 and 2.

DESCRIPTION OF THE PREFERRED EMBODIMENTS

Spatial or directional terms, such as "left", "right", "inner", "outer", "above", "below", and the like, are not to be considered as limiting as the invention can assume various alternative orientations.

All numbers used in the specification and claims are to be understood as being modified in all instances by the term "about". By "about" is meant a range of plus or minus ten percent of the stated value.

All ranges disclosed herein encompass the beginning and ending range values and any and all subranges subsumed therein. The ranges represent the average values over the specified range.

The term "over" means farther from the substrate (or base layer) on which the material under discussion is located. For example, a second layer located "over" a first layer means that the second layer is located farther from the substrate (or base layer) than is the first layer. The second layer can be in direct contact with the first layer. Alternatively, one or more other layers can be located between the first layer and the second layer.

The term "film" means a region having a chemically distinct and/or homogeneous composition. A "layer" comprises one or more "films". A "coating" comprises one or more "layers".

The terms "polymer" or "polymeric" include oligomers, homopolymers, copolymers, and terpolymers, e.g., polymers formed from two or more types of monomers or polymers.

The term "ultraviolet radiation" means electromagnetic radiation having a wavelength in the range of 100 nm to less than 380 nm. The terms "visible radiation" or "visible light" mean electromagnetic radiation having a wavelength in the range of 380 nm to 780 nm. The term "infrared radiation" means electromagnetic radiation having a wavelength in the range of greater than 780 nm to 100,000 nm.

All documents referred to herein are "incorporated by reference" in their entirety.

The terms "tempered" or "heat-treated" mean that the article or coating under discussion has been heated to a temperature sufficient to achieve thermal tempering, heat bending, and/or heat strengthening. This definition includes, for example, heating the article in an oven or furnace at a temperature of at least 580° C., such as at least 600° C., such as at least 620° C., for a period of time to achieve thermal tempering, heat bending, and/or heat strengthening. For example, the article can be heated for a period of time in the range of 1 to 15 minutes, such as 1 to 5 minutes.

The terms "annealed" or "non-heat-treated" mean not tempered or heat-treated, or not designed to be tempered or heat-treated for final use.

The terms "metal" and "metal oxide" include silicon end silica, respectively, as well as traditionally recognized metals and metal oxides, even though silicon conventionally may not be considered a metal.

By "at least" is meant "greater than or equal to". By "not greater than" is meant "less than or equal to".

Any reference to amounts, unless otherwise specified, is by weight percent (wt. %).

Thickness values, unless indicated to the contrary, are geometric thickness values.

A "dopant" can be present in an amount less than 10 wt. %, such as less than 5 wt. %, such as less than 4 wt. %, such as less than 2 wt. %. For example, less than 1 wt. %. For example, less than 0.6 wt. %. For example, less than 0.1 wt. %.

The term "includes" is synonymous with "comprises".

The term "curable" means a material capable of polymerizing or crosslinking. By "cured" is meant that the material is at least partly polymerized or crosslinked, preferably fully polymerized or crosslinked.

By "free of" is meant that the component being discussed is not intentionally present. For example, a composition described as "free of component X" or "X-free" means that component X is not intentionally added to the composition. However, there may be trace amounts of component X present in the composition due to manufacturing limitations.

By "non-chlorinated" is meant chlorine-free. By "non-brominated" is meant bromine-free.

By "ambient conditions" is meant the surrounding atmospheric conditions, for example, temperature and/or relative humidity.

Unless indicated to the contrary, contact angles recited herein are a measure of the angle between a tangent to the drop shape at the contact point and the surface of the substrate as measured through the drop and are measured by the sessile drop method using a modified captive bubble indicator manufactured by Lord Manufacturing, Inc., equipped with Gaertner Scientific goniometer optics. The surface to be measured is placed in a horizontal position, facing upwardly, in front of a light source. A sessile drop of water is placed on top of the surface in front of the light source so that the profile of the sessile drop can be viewed and the contact angle measured in degrees through the goniometer telescope, which is equipped with circular protractor graduations.

Unless indicated to the contrary, simulated weathering of the water-repellent film was obtained via weathering chambers which include the Q-C-T Cleveland Condensing Tester (hereinafter "CCC") (also known as the Cleveland Condensing Cabinet) and QUV-B313 Tester (both products of The Q-Panel Company, Cleveland, Ohio). The CCC chamber was operated at a vapor temperature of 120° F. (49° C.) in an indoor ambient environment which resulted in constant water condensation on the test surface. The QUV-B313 Tester was operated with cycles of eight hours UV (B313 lamps) at black panel temperature of 65 to 70° C. followed by four hours condensing humidity at 50° C. atmosphere temperature. QUV-B313 results are in accordance with ASTM G-53-96. CCC results are in accordance with ASTM D-4585-99. Temperature (high/low) and humidity results are in accordance with MIL-STD-810E, Method 507.3 Proc III, Aggravated.

Unless indicated to the contrary, the abrasion resistance of the water-repellent film was measured by a Wet Sled Abrasion Test. More specifically, the test was conducted using a modified Sheen Wet Abrasion Scrub Tester (ref. 903), manufactured by Sheen Instruments, Ltd., Kingston, England, that cycled two 1.5 inch (3.81 cm) long wiper blades across the surface of the water-repellent film while water was applied in front of and behind the wiper blades. A total load of about 710 grams was applied to both blades as they were moved at a rate of approximately 37 full cycles per minute. Both blades abraded a common area of about 1.5 inches by 7 inches (about 3.8 cm by 17.8 cm). With this arrangement, each wiping cycle is equivalent to 4 wiper strokes across the common area.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of, the following aspects of the invention, in any combination. Various examples of the invention may be discussed separately. However, it is to be understood that this is simply for ease of illustration and discussion. In the practice of the invention, one or more aspects of the invention described in one example can be combined with one or more aspects of the invention described in one or more of the other examples.

The invention will be discussed with reference to use with an aircraft transparency, such as an aircraft window or windshield. However, it is to be understood that the invention is not limited to use with aircraft transparencies but could be practiced with transparencies in any desired field, such as laminated or non-laminated residential and/or commercial windows, and/or transparencies for land, air, space, above water and/or underwater vehicles and/or architectural transparencies. The term "architectural transparency" refers to any transparency located on or in a building, such as windows, sky lights, or an insulating glass unit (IGU). Therefore, it is to be understood that the specifically disclosed examples are presented simply to explain the general concepts of the invention, and that the invention is not limited to these specific examples. Additionally, while a typical "transparency" can have sufficient visible light transmittance such that materials can be viewed through the transparency, in the practice of the invention, the "transparency" need not be transparent to visible light but may be translucent.

The substrate is not limiting to the invention and can be of any desired material having any desired characteristics, such as opaque, translucent, or transparent to visible light. By "transparent" is meant having a transmittance through the substrate of greater than 0% up to 100%. Alternatively, the substrate can be translucent or opaque. By "translucent" is meant allowing electromagnetic energy (e.g., visible light) to pass through the substrate but diffusing this energy such that objects on the side of the substrate opposite to the viewer are not clearly visible. By "opaque" is meant having a visible light transmittance of 0%.

The substrate may include annealed or tempered glass, e.g., conventional soda-lime-silica glass, or on exchange glass such as that said under the tradename Herculite® II on exchange glass, available from PPG Industries, Inc., Pittsburgh, Pa.; metal, plastic, enamel, or ceramic substrates, and combinations thereof. Metal substrates compatible with the present invention include, but are not limited to, galvanized steel, stainless steel, and aluminum. The substrate may be coated or uncoated. The invention may be practiced on a single or multi-layered coating film present on the surface of a substrate. Coatings for glass include, but are not limited to, antimony-tin oxide, doped tin oxide, or transition metal oxides. Coatings for plastic substrates include, but are not limited to, polysiloxane-based hard coatings and silicon oxide coatings. Coatings for metal substrates include, but are not limited to, metal oxide coatings. When the water-repellent composition is applied to a coating on the surface of a substrate, the coating provides the bonding sites for forming the water-repellent film.

Exemplary substrates include plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); metal substrates, such as galvanized steel, stainless steel, and aluminum; ceramic substrates; tile substrates; glass substrates; or mixtures or combinations of any of the above. Preferably, the substrate comprises glass. For example, the substrate can be conventional untinted soda-lime-silica glass, i.e., "clear glass", or can be tinted or otherwise colored glass, borosilicate glass, leaded glass, tempered, untempered, annealed, or heat-strengthened glass. The glass may be of any type, such as conventional float glass or flat glass, and may be of any composition having any optical properties, e.g., any value of visible radiation transmission, ultraviolet radiation transmission, infrared radiation transmission, and/or total solar energy transmission. Preferably, the substrate comprises glass. Examples of glass suitable for the practice of the invention are described in U.S. Pat. Nos. 4,746,347; 4,792,538; 5,240,886; 5,385,872; and 5,393,593.

Optionally, prior to application of the water repellant coating of the invention over the substrate, the surface (or at least a portion of the surface) over which the water repellant coating is to be deposited can be cleaned, polished, and/or otherwise pretreated, for example to remove dirt and/or surface contaminants. Examples of such pretreatments are described in U.S. Pat. Nos. 5,707,740 and 5,980,990.

For example, at least a portion of the substrate surface can be activated by applying an acid solution to extend the durability of the subsequently applied water repellant coating. The acid solutions used can be selected based upon their ability to increase the durability of the water repellant coating without damaging the substrate. Exemplary acid solutions include solutions of hydrochloric acid, sulfuric acid, and organic acids. For example, organic acid solutions, such as strong organic acid solutions having a pH of less than 5, such as less than 3, can be used. Other acids that can be used include phosphoric acid, hydrobromic acid, nitric acid, acetic acid, trifluoroacetic acid, and/or citric acid.

Where the acid is hydrochloric acid, an acid solution of hydrochloric acid dissolved in deionized water in the range of 0.5-30 wt. % hydrochloric acid can be used, e.g., 0.5-20 wt. %, such as 0.5-10 wt. %, Where the acid is sulfuric acid, an acid solution of sulfuric acid dissolved in deionized water in the range of 0.5-30 wt. % sulfuric acid can be used, e.g., 0.5-20 wt. %, such as 0.5-10 wt. %. Where the acid is tartaric acid, an acid solution of tartaric acid dissolved in deionized water where the acid concentration is in the range of 1-40 wt. % tartaric acid dissolved in the balance of deionized water can be used, e.g., 2-20 wt. %. As can be appreciated, lower and higher acid concentrations can be used, however, using such concentrations can require correspondingly more or less activating time on the substrate to improve the durability of the water repellent film.

The acid activation of the substrate surface can be accomplished by applying the acid solution to the substrate by any conventional technique, such as dipping, flowing, spraying, or wiping. While no set number of wipes are required, it has been found that contacting the substrate for about two minutes provides acceptable results. Wiping can be done by applying moderate hand pressure to an absorbent acid-resistant pad containing the acid solution, such as a cotton pad.

Where the add solution is volatile and will evaporate from the substrate without leaving a residue, the add solution can be applied to the substrate and allowed to evaporate, whereupon the water repellent composition can be applied over the substrate. Volatile add solutions are defined herein as those which are capable of volatilizing at ambient conditions within a short time period (e.g., within 10 minutes or less) after application to the substrate. Examples of volatile add solutions include hydrochloric, hydrobromic, acetic, nitric, and trifluoroacetic add solutions.

Where the add solution is non-volatile, or is volatile but leaves behind a residue upon evaporation, the substrate can be rinsed with distilled or deionized water after the add activation step to remove the add solution or its residue. After rinsing, the substrate can be dried and the water repellent composition applied over the substrate. Non-volatile acid solutions are defined herein as those which are not capable of volatilizing at ambient conditions within a short time period (e.g., within 10 minutes or less) after application to the substrate. Examples of non-volatile adds include sulfuric, tartaric, citric, and phosphoric adds. The rinsing solution can include water, such as distilled or deionized water, or alcohol mixed with water.

Alternatively or additionally, prior to deposition of the water repellant coating, the surface (or at least a portion thereof) over which the coating is to be applied optionally can be simultaneously abrasively and chemically prepared as described in U.S. Pat. No. 6,025,025. For example, prior to applying the water repellent coating, a dispersion including at least one abrading compound and at least one add in solution can be applied over at least a portion of the substrate, e.g., that portion of the substrate where the water repellant coating is to be deposited.

Factors affecting the choice of adds for inclusion in the add solution include the substrate being treated, the acid or add combination selected, the abrading compound dispersed in the add solution, and the strength and type of chemical bonding between the materials being removed and the substrate. For example, the add solution can be selected to remove materials from the substrate surface without completely dissolving the abrading compound dispersed therein and without damaging the surface of the substrate being treated. The acid can be selected such that the spades removed from the substrate surface, such as Na, Ca, Sn, Fe, and Al ions, remain soluble in the acid solution to prevent their precipitation from the acid solution and redeposition on the substrate surface.

Exemplary acids for use with many substrates include hydrochloric add, sulfuric acid, phosphoric add, hydrobromic add, nitric acid, and organic acids, or mixtures thereof. Where organic adds are selected, strong organic acid solutions can be used, which include acid solutions having a pH of less than 5, such as less than 3 (e.g., tartaric acid, acetic acid, oxalic acid, trifluoroacetic add, and citric acid).

Add concentrations in the add solution depend largely upon the add or adds selected, the add solution solvent, and the interaction between the add solution and the substrate. However, for many applications, add concentrations can be generally in the range of 1 to 6 weight percent. Where the add is hydrochloric add ("HCl"), an add solution of hydrochloric add dissolved in water in the range of 0.1 to 30 wt. % hydrochloric add, such as 0.1 to 20 wt. %, such as 0.5 to 10 wt. %, such as 1 to 5 wt. %, can be used. The foregoing ranges and discussion are also applicable for sulfuric add. Where the add is tartaric add, an add concentration of tartaric add in the range of 1 to 40 wt. %, such as 2 to 20 wt. %, can be used. As can be appreciated, lower and higher add concentrations can be used; however, using such concentrations can require correspondingly more or less activating time on the substrate to improve the durability of the water repellent film.

Factors affecting the selection of suitable abrading compounds include, but are not limited to, the substrate being treated, the ability of the abrading compound to withstand the acidic environment of the add solution, the grit size or other abrasive measure of the abrading compound, the method of treating the surface of the substrate with the abrading compound, the strength and type of bonding between the materials being removed, and substrate, and the acquisition costs, ease of use, safety and disposal costs associated with a particular abrading compound. Where the surface of the substrate is treated by wiping the abrading compound/acid solution dispersion over the surface of the substrate, the amount of force directed toward the substrate and the number of passes to be applied over the surface of the substrate can be considered when selecting an abrading compound. The abrading compound can be present in sufficient concentration and have sufficient abrasiveness to loosen and dislodge the materials blocking the bonding sites for the number of passes applied with the applied pressure, while being able to withstand the acidic environment of the add solution and not materially affect the mechanical or optical properties of the surface, as for example, by scratching the surface to render the substrate unacceptable for its intended use. For many applications, removal of 0.2 nm to 1 nm of the substrate's surface can expose a sufficient number of bonding sites to measurably improve the durability of the water repellent film. Abrading compounds suitable for use with many add solutions include, but are not limited to, alumina, ceria, iron oxide, garnet, zirconia, silica, silicon carbide, chromic oxide, pumice, and diamond-based abrading compounds, and combinations thereof.

The abrading compound can have a grit size in the range of 0.1 to 20 microns, such as 0.5 to 5 microns, e.g., 1 to 3 microns. The abrading compound can be in dry particulate form or can be present as a dispersion in a liquid carrier. Although not limiting in the present invention, one type of abrasive material that can be used is Microgrit® WCA lapping powder, which is an aluminum oxide abrasive available from Micro Abrasives Corporation, Westfield, Mass. The abrading compound can be added in the range of 5 to 30 wt. % to an acid solution to form the abrading compound/acid solution dispersion as discussed earlier. By way of a non-limiting example, where the substrate is a glass substrate, suitable abrading compounds include alumina or ceria having an average size of to 3 microns, which are present in a total concentration of 15 to 20 wt. % in a 1 to 5 wt. % hydrochloric acid/deionized water solution.

The activation of the substrate can be accomplished by applying and wiping the abrading compound/acid solution dispersion on the substrate surface by any conventional technique known in the art. For example, the dispersion can be applied directly on the substrate surface and wiped by hand, applying moderate hand pressure to an absorbent, acid-resistant pad. The dispersion can also be applied directly to the pad and subsequently wiped on the substrate surface. Alternatively, powered equipment, such as an orbital sander with a non-abrasive pad, can be used to apply the abrading compound/acid solution dispersion. The substrate surface can be wiped at least until the abrading compound/acid solution dispersion "wets" the surface of the substrate, i.e., until it no longer "pulls away" from any part of the substrate surface. The abrading compound/acid solution dispersion can be applied for a dwell time, i.e., the amount of time the abrading compound/acid solution dispersion remains on the substrate before being removed, in the range of about 1 to 5 minutes, such as about 1 to 2 minutes.

Two Step Process

Whether or not any of the above-described optional pretreatment steps is performed, the water repellant coating can be formed over the substrate in a two step process. In the two step process, a primer composition is applied over the substrate prior to application of the water repellant coating composition.

The primer composition can comprise a silicon material and an organic solvent.

The silicon material can comprise, for example, alkyl silicates or hydrolyzable silicon containing compounds such as tetra-acetoxysilane or chlorosilanes. For example, the silicon material can comprise tetrachlorosilane, hexachlorodisiloxane, or partially hydrolyzed and condensed mixtures thereof. Examples include silanes having the general formula $SiX_4$, where X is a hydrolysable radical selected from halogens, alkoxy radicals, acyloxy radicals. For example, X can be selected from chloro, bromo, iodo, methoxy, ethoxy, and acetoxy. Preferred hydrolysable radicals include tetrachlorosilane, tetramethoxysilane, tetraethoxysilane, and tetraacetoxysilane. Preferably, the silicon material comprises tetrachlorosilane.

Suitable solvents include isopropanol, ethanol, hexane, heptane, mineral spirits, acetone, toluene, naphtha, and halogenated hydrocarbon solvents. Preferred solvents are halogenated hydrocarbon solvents, such as trichlorotrifluoroethane and methylene chloride, and perfluorinated organic compounds, such as pefluorocarbons. The solvent can be, for example, a hydrofluoroether. For example, the solvent can comprise pentane, 1,1,1,2,2,3,4,5,5,5-decafluoro-3-methoxy-4-(trifluoromethyl)-. An example of a suitable halogenated solvent is Novec 7300 fluid, commercially available from 3M Corporation.

The silicon material is present in the range of greater than 0 weight percent (wt. %) to 10 wt. %, such as in the range of 0.1 wt. % to 5 wt. %, based on the total weight of the primer composition. Preferably, the silicon material is present in the range of 0.5 wt. % to 1 wt. %.

The primer composition is applied onto the substrate in any conventional manner. Examples include dipping, flowing, and wiping. The primer composition can be allowed to dry under ambient atmospheric conditions. For example, the primer composition can be air dried in the range of one minute to 3 hours, such as one minute to one hour, such as one minute to 30 minutes. For example, the primer composition can be air dried in the range of one minute to 10 minutes. For example, the primer composition can be air dried in the range of one minute to 5 minutes. Or, excess primer composition can be removed by wiping.

The water repellant coating composition is applied over the primed substrate in any conventional manner. Examples include dipping, flowing, and wiping.

An exemplary water repellant coating composition comprises a perfluoroalkylalkysilane, such as a non-chlorinated perfluoroalkylalkysilane, and an organic solvent.

The organic solvent can be any of those discussed above. For example, the solvent can be a halogenated hydrocarbon solvent, such as trichlorotrifluoroethane and methylene chloride, and/or can comprise perfluorinated organic compounds, such as perfluorocarbons. The organic solvent can be a halogenated solvent, for example, a hydrofluoroether. For example, the halogenated solvent can comprise pentane, 1,1,1,2,2,3,4,5,5,5-decafluoro-3-methoxy-4-(trifluoromethyl)-. An example of a suitable halogenated solvent is Novae 7300 fluid, commercially available from 3M Corporation.

The water repellant coating material can include a perfluoroalkylalkysilane. Exemplary perfluoroalkylalkysilanes have the general formula $(R^1{}_nR^2)_mSiX_{4-m}$, where $R^1$ is a perfluoroalkyl moiety having the general formula $C_qF_{2q+1}$; $R^2$ is a bisubstituted organic radical preferably having the general formula $(C_aH_{2a})$; and X is one or more hydrolyzable moieties, such as one or more halogen, acyloxy, and/or alkoxy moieties. By "bisubstituted organic radical" is meant an organic moiety substituted in two places, i.e., attached with other components in two pieces. It is to be understood that the "X" substituents for a particular perfluoroalkylalkysilane need not all be the same moiety. For example, one substituent could be a halogen, one substituent could be an acyloxy moiety, and one substituent could be an alkoxy moiety. Preferably, m is in the range of 1 to 3; n is greater than or equal to 1, such as in the range of 1 to 3; g is in the range of 1 to 30; and a is in the range of 2 to 10.

Examples of perfluoroalkyl moieties ($R^1$) include those having g in the range of 1 to 30, such as 3 to 18, such as 3 to 7, such as 3 to 6, such as 6. The perfluoroalkyl component of the perfluoroalkylalkysilane can be a branched chain or a straight, i.e., normal, chain. Examples of bisubstituted organic moieties ($R^2$) include those having branched or normal carbon chains with a in the range of 2 to 10, such as 2 to 5, such as 2 to 3, For example, $R^2$ can be a substituted alkyl such as ethyl, propyl, butyl, and pentyl, preferably ethyl. Examples of constituents for X include hydrolyzable chloro, bromo, iodo, methoxy, ethoxy, and acetoxy groups. Examples of perfluoroalkylalkylsilanes include perfluoroalkylethyltrichlorosilane, perfluoroalkylethyltrimethoxysilane, perfluoroalkylethyltriacetoxysilane, perfluoroalkylethyldichloro(methyl)silane, perfluorooctylethyltrichlorosilane, and perfluoroalkylethyldiethoxy(methyl)silane.

The perfluoroalkylalkysilane can comprise a non-chlorinated perfluoroalkylalkysilane. The perfluoroalkylalkysilane can comprise a non-brominated perfluoroalkylalkysilane. For example, X can be selected from methoxy, ethoxy, and acetoxy groups. The perfluoroalkylalkysilane can be free of chlorine and/or bromine.

For example, the perfluoroalkylalkysilane can comprise 1H,1H,2H,2H-perfluorooctyltriethoxysilane. For example, the perfluoroalkylalkysilane can comprise $C_6F_{13}CH_2CH_2Si(OC_2H_5)_3$, triethoxy(3,3,4,4,5,5,6,6,7,7,8,8,8-tridecafluorooctyl)silane.

The perfluoroalkylalkysilane is present in the range of greater than 0 weight percent (wt. %) to 10 wt. %, such as in the range of 0.1 wt. % to 5 wt. %, based on the total weight of the water repellant coating composition. The perfluoroalkylalkysilane can be present in the range of 1 wt. % to 3.5 wt. %. The perfluoroalkylalkysilane can be present in the range of 2 wt. % to 3 wt. %.

Another exemplary water repellant coating composition comprises a silanol-terminated polyorganosiloxane, such as a non-halogenated silanol-terminated polyorganosiloxane, and a siloxane bond-forming crosslinking agent.

The silanol-terminated polyorganosiloxane can comprise a silanol-terminated polydialkylsiloxane. The alkyl substituents of the silanol-terminated polydialkylsiloxane can be the same or different. For example, the alkyl substituents of the silanol-terminated polydialkylsiloxane include 1 to 10 carbons, such as 1 to 5 carbons. The silanol-terminated polyorganosiloxane can be a non-halogenated silanol-terminated polyorganosiloxane. The silanol-terminated polydialkylsiloxane can comprise a silanol-terminated polydimethylsiloxane having the general formula $HOSi(CH_3)_2O[Si(CH_3)_2O]_mSi(CH_3)_2OH$, where m is in the range of 5 to 20, such as in the range of 7 to 18, A suitable silanol-terminated polyorganosiloxane is DMS-S14, commercially available from Gelest Corporation.

The siloxane bond-forming crosslinking agent is any material that promotes the formation of siloxane bonds. For example, the crosslinking agent can be selected from the group consisting of polydiethoxysilane, tetramethoxysilane, tetraethoxysilane, methyltriethoxysilane, and tetra-n-propylsilane, preferably tetraethoxysilane.

The silanol-terminated polyorganosiloxane can be in the range of 1 to 99 weight percent, such as 50 to 99 weight percent, such as 80 to 99 weight percent, such as 85 to 98 weight percent, based on the total weight of the water repellant coating composition.

The siloxane bond-forming crosslinking agent can be in the range of 0.5 to 10 weight percent, such as 1 to 5 weight percent, such as 1 to 3 weight percent, based on the total weight of the water repellant coating composition.

The water repellant composition is applied onto the substrate, e.g., over the primed substrate, in any conventional manner. Examples include dipping, flowing, and wiping. The water repellant composition can be dried under ambient conditions. For example, the water repellant coating composition can be aft dried under ambient conditions in the range of one minute to 3 hours, such as one minute to one hour, such as one minute to 30 minutes, such as one minute to 10 minutes. For example, the water repellant coating composition can be air dried under ambient conditions in the range of one minute to 5 minutes.

Optionally, the water repellant composition can be dried using a heat source, such as a heat lamp, a heat blanket, or oven. The water repellant composition can be exposed to a temperature in the range of 100° F. to 500° F. (38° C. to 260° C.), such as 125° F. to 300° F. (52° C. to 149° C. The water repellant composition can be exposed to a temperature in the range of 125° F. to 200° F. (52° C. to 93° C.). The water repellant composition can be exposed to a temperature of 150° F. (65.5° C.).

The water repellant composition can be heated in the range of 1 hour to 24 hours, such as 2 hours to 15 hours. The water repellant composition can be heated in the range of 4 hours to 10 hours. The water repellant composition can be heated in the range of 4 hours to 8 hours.

One Step Process

A treatment system of the invention can also be a one-step system, i.e., not inducting the optional priming step described above.

In an exemplary one-step system, the water repellant coating composition comprises an alcohol, a halogenated solvent, a catalyst, and a perfluoroalkylalkysilane, such a non-chlorinated perfluoroalkyakylsilane.

The alcohol is selected from the group consisting of alkanols, aryl alcohols, alkene alcohols, and alkyne alcohols. For example, the alcohol can be an alkanol. For example, the alcohol can be selected from the group consisting of methanol, ethanol, propanol, and butanol. For example, the alcohol can comprise ethanol.

The halogenated solvent can comprise any of those described above. For example, the halogenated solvent can be a hydrofluoroether. For example, the halogenated solvent can comprise pentane,1,1,1,2,2,3,4,5,5,5-decafluoro-3-methoxy-4-(trifluoromethyl)-. An example of a suitable halogenated solvent is Novec 7300 fluid, commercially available from 3M Corporation.

The catalyst can comprise an acid. The acid can comprise a monoprotic acid or a polyprotic acid, or mixtures thereof. For example, the acid can comprise hydrochloric acid. For example, the acid can comprise 0.5 M hydrochloric acid.

The perfluoroalkylalkysilane can be a non-chlorinated perfluoroalkylalkysilane as described above. For example, the non-chlorinated perfluoroalkylalkysilane can comprise 1H,1H,2H,2H-perfluorooctyltriethoxysilane. For example, the non-chlorinated perfluoroalkylalkysilane can comprise $C_6F_{13}CH_2CH_2Si(OC_2H_5)_3$, i.e., triethoxy(3,3,4,4,5,5,6,6,7,7,8,8,8-tridecafluorooctyl)silane.

The alcohol can be in the range of 75 to 95 weight percent, such as 80 to 90 weight percent, based on the total weight of the coating composition. The alcohol can be in the range of 80 to 85 weight percent. The alcohol can be in the range of 82 to 85 weight percent. The alcohol can be in the range of 83 to 84 weight percent.

The catalyst can be in the range of 2 to 8 weight percent, such as 2 to 7 weight percent, such as 3 to 6 weight percent, based on the total weight of the coating composition. The catalyst can be in the range of 4 to 6 weight percent. The catalyst can be in the range of 4 to 5 weight percent.

The halogenated solvent can be in the range of 5 to 15 weight percent, such as 6 to 12 weight percent, such as 8 to 12 weight percent, based on the total weight of the coating composition. The halogenated solvent can be in the range of 9 to 11 weight percent. The halogenated solvent can be in the range of 9 to 10 weight percent.

The perfluoroalkylalkysilane can be in the range of 0.5 to 7 weight percent, such as 1 to 6 weight percent, such as 1 to 5 weight percent, based on the total weight of the coating composition. The perfluoroalkylalkysilane can be in the range of 1 to 3 weight percent. The perfluoroalkylalkysilane can be in the range of 1 to 2 weight percent.

The one step composition can be supplied in a treatment system comprising two containers, with each container containing a portion of the one step coating composition. For example, the treatment system can comprise a first container containing the alcohol and the catalyst, and a second container containing the halogenated solvent and the perfluoroalkylalkysilane. Rather than sealed ampules, the containers can be vials having removable lids.

In the first container, the alcohol can be present in the range of 70 to 99 weight percent, such as 75 to 99 weight percent, such as 80 to 99 weight percent, based on the total weight of the components in the first container. The alcohol can be present in the range of 90 to 99 weight percent. The alcohol can be present in the range of 94 to 95 weight percent.

In the first container, the catalyst can be present in the range of 1 to 10 weight percent, such as 1 to 8 weight percent, such as 2 to 7 weight percent, based on the total weight of the components in the first container. The catalyst can be present in the range of 3 to 6 weight percent. The catalyst can be present in the range of 5 to 6 weight percent.

In the second container, the halogenated solvent can be present in the range of 70 to 90 weight percent, such as 75 to 90 weight percent, based on the total weight of the components in the second container. The halogenated solvent can be present in the range of 75 to 85 weight percent. T the halogenated solvent can be present in the range of 80 to 85 weight percent. The halogenated solvent can be present in the range of 83 to 84 weight percent.

In the second container, the perfluoroalkylalkysilane can be present in the range of 10 to 20 weight percent, such as 11 to 19 weight percent, such as 12 to 18 weight percent, based on the total weight of the components in the second container. The perfluoroalkylalkysilane can be present in the range of 14 to 17 weight percent. The perfluoroalkylalkysilane can be present in the range of 16 to 17 weight percent.

The use of a non-chlorinated perfluoroalkylalkysilane decreases the risk of ozone depletion compared to previous water repellant coatings.

To form a coating on an aircraft transparency, the two containers are opened and the contents are mixed to form the coating composition. The coating composition is applied onto the substrate in any conventional manner. Examples include dipping, flowing, and wiping. The coating comprises the reaction product of the contents of the two containers.

The coating composition is allowed to dry (e.g., cure) to form a water repellant coating on the aircraft transparency. The coating composition can be dried under ambient conditions in the range of 30 minutes to 10 hours. The coating composition can be dried under ambient conditions in the range of one hour to 5 hours. The coating composition can be dried under ambient conditions in the range of one hour to 3 hours. The coating composition can be dried under ambient conditions for 2 hours.

Optionally, the water repellant composition can be dried using a heat source, such as a heat lamp, a heat blanket, or oven. The water repellant composition can be exposed to a temperature in the range of 100° F. to 500° F. (38° C. to 260° C.), such as 125° F. to 300° F. (52° C. to 149° C.). The water repellant composition can be exposed to a temperature in the range of 125° F. to 200° F. (52° C. to 93° C.). The water repellant composition can be exposed to a temperature of 150° F. (65.5° C.).

The water repellant composition can be heated for 1 hour to 24 hours, such as 2 hours to 15 hours. The water repellant composition can be heated for 4 hours to 10 hours. The water repellant composition can be heated for 4 hours to 8 hours.

Optionally, the one step composition can include an integral primer. For example, the integral primer can be a hydrolyzable silane or siloxane capable of hydrolytic condensation to form silica gel. Exemplary aeries have the general formula $SiZ_4$, wherein Z can be a hydrolyzable group, such as one or more halogen, allow, and/or acyloxy groups. Examples of suitable Z moieties include chloro, bromo, iodo, methoxy, ethoxy, and acetoxy groups. Examples of suitable hydrolyzable silanes include tetrachlorosilane, tetramethoxysilane, and tetraacetoxysilane, preferably tetrachlorosilane.

Exemplary siloxanes can have the general formula $Si_yO_zX_{4y-2z}$, wherein X can be one or more halogen, alkoxy, and/or acyloxy groups, y can be two or more, z can be one or more, and 4y−2z is greater than zero. Suitable hydrolyzable siloxanes include hexachlorodisiloxane, octachlorotrisiloxane, and higher oligomer chlorosiloxanes.

The optional integral primer can be present in the range of greater than 0 wt. % to 5 wt. %, such as 0.05 wt. % to 2 wt. %, based on the total weight of the composition.

The water repellant composition is applied onto the substrate in any conventional manner. Examples include dipping, flowing, and wiping. The water repellant composition can be dried under ambient conditions.

Another exemplary one-step treatment system comprises an alcohol, a polyorganosiloxane, such as a non-halogenated silanol-terminated polyorganosiloxane, a catalyst, and a dioxane bond-forming crosslinking agent.

The alcohol can be selected from the group consisting of alkanols, aryl alcohols, alkene alcohols, and alkyne alcohols. For example, the alcohol can be an alkanol. For example, the alcohol can be selected from the group consisting of methanol, ethanol, propanol, and butanol. For example, the alcohol can comprise ethanol.

The silanol-terminated polyorganosiloxane can comprise a silanol-terminated polydialkylsiloxane. The alkyl substituents of the silanol-terminated polydialkylsiloxane can be the same or different. The silanol-terminated polydialkylsiloxane can be a none halogenated polyorganosiloxane. For example, the alkyl substituents of the silanol-terminated polydialkylsiloxane include 1 to 10 carbons, such as 1 to 5 carbons. The silanol-terminated polydialkylsiloxane can comprise a silanol-terminated polydimethylsiloxane having the general formula $HOSi(CH_3)_2O[S(CH_3)_2O]_mSi(CH_3)_2OH$, where m is in the range of 5 to 20, such as in the range of 7 to 18. A suitable silanol-terminated polyorganosiloxane is DMS-S14, commercially available from Gelest Corporation.

The catalyst can comprise an acid. The acid can comprise a monoprotic add or a polyprotic add, or mixtures thereof. For example, the add can comprise hydrochloric acid, for example, 0.5 M hydrochloric add, sulfuric acid, phosphoric acid, carbonic add, or mixtures thereof. For example, the acid can comprise sulfuric acid. For example, the acid can comprise sulfuric acid, e.g., 50 volume %.

The siloxane bond-forming crosslinking agent can be selected from the group consisting of polydiethoxysilane, tetramethoxysilane, tetraethoxysilane, methyltriethoxysilane, and tetra-n-propoxysilane, preferably tetraethoxysilane.

The alcohol can be in the range of 80 to 99 weight percent, such as 85 to 99 weight percent, such as 90 to 99 weight percent, based on the total weight of the coating composition. The alcohol can be in the range of 95 to 98 weight percent. The alcohol can be in the range of 96 to 97 weight percent.

The catalyst can be in the range of 0.1 to 6 weight percent, such as 0.2 to 2 weight percent, such as 0.5 to 1 weight percent, based on the total weight of the coating composition. The catalyst can be in the range of 0.7 to 0.8 weight percent. The catalyst can be in the range of 0.75 to 0.77 weight percent.

The silanol-terminated polyorganosiloxane can be in the range of 1 to 10 weight percent, such as 1 to 5 weight percent, such as 1.5 to 4 weight percent, based on the total weight of the coating composition. The silanol-terminated polyorganosiloxane can be in the range of 2 to 3 weight percent. The silanol-terminated polyorganosiloxane can be in the range of 2 to 2.5 weight percent.

The siloxane bond-forming crosslinking agent can be in the range of 0.01 to 1 weight percent, such as 0.05 to 0.8 weight percent, such as 0.1 to 0.5 weight percent, based on the total weight of the coating composition. The siloxane bond-forming crosslinking agent can be in the range of 0.2 to 0.4 weight percent. The siloxane bond-forming crosslinking agent can be in the range of 0.2 to 0.3 weight percent.

The composition can be supplied in a coating system comprising two containers, with each container containing a portion of the coating composition. For example, the treatment system can comprise a first container comprising the silanol-terminated polyorganosiloxane and the siloxane bond-forming crosslinking agent, and a second container comprising the alcohol and the catalyst.

In the first container, the silanol-terminated polyorganosiloxane can be in the range of 76 to 95 weight percent, such as 80 to 95 weight percent, such as 85 to 95 weight percent, based on the total weight of the components in the first container. The silanol-terminated polyorganosiloxane can be in the range of 86 to 90 weight percent. The silanol-terminated polyorganosiloxane can be in the range of 88 to 89 weight percent.

In the first container, the siloxane bond-forming crosslinking agent can be in the range of 5 to 20 weight percent, such as 8 to 15 weight percent, such as 9 to 13 weight percent, based on the total weight of the components in the first container. The siloxane bond-forming crosslinking agent can be in the range of 10 to 12 weight percent. The siloxane bond-forming crosslinking agent can be in the range of 11 to 12 weight percent.

In the second container, the alcohol can be in the range of 97 to 99.9 weight percent, such as 97.5 to 99.9 weight percent, such as 98 to 99.9 weight percent, based on the total weight of the components in the second container. The alcohol can be in the range of 98.5 to 99.9 weight percent. The alcohol can be in the range of 98.5 to 99.5 weight percent.

In the second container, the catalyst can be in the range of 0.1 to 3 weight percent, such as 0.5 to 1 weight percent, such as 0.6 to 0.9 weight percent, based on the total weight of the components in the second container. The catalyst can be in the range of 0.7 to 0.8 weight percent. The catalyst can be in the range of 0.77 to 0.79 weight percent.

To form a coating on an aircraft transparency, the two containers are opened and the contents are mixed to form the coating composition. The coating composition is applied onto the substrate in any conventional manner. Examples include dipping, flowing, and wiping. The coating comprises the reaction product of the contents of the two containers.

The coating composition is allowed to dry (e.g., cure) to form a water repellant coating on the aircraft transparency. The coating composition can be dried under ambient conditions in the range of 30 minutes to 10 hours, such as one hour to 5 hours. The coating composition can be dried under ambient conditions in the range of one hour to 3 hours. The coating composition can be dried under ambient conditions for 2 hours.

Optionally, the water repellant composition can be dried using a heat source, such as a heat lamp, a heat blanket, or oven. The water repellant composition can be exposed to a temperature in the range of 100° F. to 500° F. (38° C. to 260° C.), such as 125° F. to 300° F. (52° C. to 149° C.). The water repellant composition can be exposed to a temperature in the range of 125° F. to 200° F. (52° C. to 93° C.), such as 150° F. (85.5° C.).

The water repellant composition can be heated for 1 hour to 24 hours, such as 2 hours to 15 hours. The water repellant composition can be heated for 4 hours to 10 hours, such as 4 hours to 8 hours.

The water repellant coatings of the invention can provide an initial water contact angle (sessile drop) of at least 60, such as at least 70, such as at least 80. For example, the initial contact angle can be at least 90. For example, the initial contact angle can be at least 100. For example, the initial contact angle can be in the range of 80 to 125. For example, the initial contact angle can be in the range of 90 to 120. For example, the initial contact angle can be in the range of 100 to 115.

The water repellant coatings of the invention can provide a water contact angle (sessile drop) of at least 60, such as at least 70, after 1000 hours exposure to a Cleveland Condensation Test (in accordance with ASTM D-4585-99). For example, the contact angle can be at least 80. For example, the contact angle can be in the range of 80 to 90.

The water repellant coatings of the invention can provide a water contact angle (sessile drop) of at least 80 after 4 weeks exposure to a Cleveland Condensation Test (in accordance with ASTM D-4585-99). The water repellant coatings of the invention can provide a water contact angle (sessile drop) of at least 70 after 6 weeks exposure to a Cleveland Condensation Test (in accordance with ASTM D-4585-99). The water repellent coatings of the invention can provide a water contact angle (sessile drop) of at least 60 after 8 weeks exposure to a Cleveland Condensation Test (in accordance with ASTM D-4585-99).

The water repellent coatings of the invention also provide other advantages. For example, the coating composition comprising a non-chlorinated perfluoroalkylalkysilane overcomes at least some of the disadvantages of the known chlorinated water repellant coatings. For example, the use of a non-chlorinated perfluoroalkylalkysilane reduces the problem of ozone depletion. Further, the use of ventilation equipment and/or hazardous waste handling procedures can be reduced or eliminated. The coating composition comprising the non-halogenated, e.g., non-fluorinated, polyorganosiloxane not only overcomes these problems but also decreases the risk of the formation of greenhouse gasses.

The invention further can be described in the following numbered clauses:

Clause 1: A method of treating an aircraft transparency comprises applying a water repellant coating composition over a surface of an aircraft transparency substrate, the water repellant coating composition comprising at least one of a non-chlorinated perfluoroalkylalkysilane and a non-halogenated polyorganosiloxane.

Clause 2: The method of clause 1, including: applying a primer composition comprising an organic solvent and a silicon material over the aircraft transparency substrate to form a primed substrate surface; applying the water repellant coating composition over the primed substrate surface; and heating the water repellant coating composition to form a water repellant coating.

Clause 3: The method of clause 2, wherein the silicon material comprises a silane having the general formula $SiX_4$, where X is a hydrolyzable radical selected from halogens, alkoxy radicals, acyloxy radicals.

Clause 4: The method of clause 3, wherein X is selected from chloro, bromo, iodo, methoxy, ethoxy, and acetoxy, preferably chloro.

Clause 5: The method of any of clauses 2 to 4, wherein the silicon material is selected from tetrachlorosilane, tetramethoxysilane, tetraethoxysilane, and tetraacetoxysilane, preferably tetrachlorosilane.

Clause 8: The method of any of clauses 2 to 5, wherein the organic solvent of the primer composition comprises a halogenated hydrocarbon solvent.

Clause 7: The method of any of clauses 2 to 6, wherein the organic solvent of the primer composition comprises a hydrofluoroether.

Clause 8: The method of any of clauses 2 to 7, wherein the organic solvent of the primer composition comprises pentane,1,1,1,2,2,3,4,5,5,5-decafluoro-3-methoxy-4-(trifluoromethyl)-.

Clause 9: The method of any of clauses 2 to 8, wherein the silicon material is present in the range of greater than 0 weight percent (wt. %) to 10 wt. %, such as in the range of 0.1 wt. % to 5 wt. %, based on the total weight of the primer composition.

Clause 10: The method of any of clauses 2 to 9, wherein the silicon material is present in the range of 0.5 wt. % to 1 wt. %, based on the total weight of the primer composition.

Clause 11: The method of any of clauses 2 to 10, wherein the primer composition is dried under ambient atmospheric conditions.

Clause 12: The method of any of clauses 2 to 11, wherein the primer composition is dried under ambient conditions in the range of one minute to 3 hours, such as one minute to 1 hour, such as one minute to 30 minutes, preferably one minute to 10 minutes, more preferably 1 minute to 5 minutes.

Clause 13: The method of any of clauses 2 to 12, wherein the water repellant coating composition comprises an organic solvent and the non-chlorinated perfluoroalkylalkysilane.

Clause 14: The method of clause 13, wherein the organic solvent of the water repellant coating composition comprises a halogenated solvent, such as a hydrofluoroether.

Clause 15: The method of clauses 13 or 14, wherein the organic solvent of the water repellant coating composition comprises pentane,1,1,1,2,2,3,4,5,5,5-decafluoro-3-methoxy-4-(trifluoromethyl)-.

Clause 16: The method of any of clauses 2 to 15, wherein the non-chlorinated perfluoroalkylalkysilane has the general formula $(R^1{}_nR^2{}_2)_mSiX_{4-m}$, where $R^1$ is a perfluoroalkyl moiety having the general formula $C_qF_{2q+1}$; $R^2$ is a bisubstituted organic radical having the general formula $.(C_8H_{2s}).$; and X is one or more hydrolyzable moieties selected from acyloxy and/or alkoxy moieties, wherein m is in the range of 1 to 3, n is in the range of 1 to 3, s is in the range of 2 to 10, and q is in the range of 2 to 8.

Clause 17: The method of deuce 16, wherein q is in the range of 3 to 7, preferably 4 to 8, more preferably 6.

Clause 18: The method of clauses 16 or 17, wherein q is 6, $R^2$ is ethyl, m is 1, and X is ethoxy.

Clause 19: The method of any of deuces 2 to 12, wherein the water repellant coating composition comprises a non-halogenated polyorganosiloxane and a siloxane bond forming crosslinking agent.

Clause 20: The method of clause 19, wherein the non-halogenated polyorganosiloxane comprises a silanol-terminated polydialkylsiloxane.

Clause 21: The method of clauses 19 or 20, wherein the polyorganosiloxane comprises a silanol-terminated polydimethylsiloxane having the general formula $HOSi(CH_3)_2O[Si(CH_3)_2O]_mSi(CH_3)_2OH$, where m is in the range of 5 to 20, preferably in the range of 7 to 18.

Clause 22: The method of any of clauses 19 to 21, wherein the siloxane bond-forming crosslinking agent is selected from the group consisting of polydiethoxysilane, tetramethoxysilane, tetraethoxysilane, methyltriethoxysilane, and tetra-n-propoxysilane, preferably tetraethoxysilane.

Clause 23: The method of any of clauses 19 to 22, wherein the polyorganosiloxane is in the range of 80 to 99 weight percent, preferably 85 to 98 weight percent, based on the total weight of the water repellant coating composition.

Clause 24: The method of any of clauses 19 to 23, wherein the siloxane bond-forming crosslinking agent is in the range of 1 to 5 weight percent, preferably 1 to 3 weight percent, based on the total weight of the water repellant coating composition.

Clause 25: The method of any of clauses 2 to 24, wherein the water repellant composition is dried at ambient conditions in the range of 1 minute to 3 hours, such as 1 minute to 1 hour, such as 1 minute to 30 minutes, preferably 1 minute to 10 minutes, more preferably 1 minute to 5 minutes.

Clause 26: The method of any of clauses 2 to 26, wherein the water repellant composition is heated to a temperature in the range of 125° F. to 300° F. (52° C. to 149° C.), preferably 125° F. to 200° F. (52° C. to 93° C.).

Clause 27: The method of clause 26, wherein the water repellant composition is heated for 2 hours to 15 hours, preferably 6 hours to 10 hours, more preferably 4 hours to 8 hours.

Clause 28: The method of clause 1, wherein the water repellant coating composition comprises an alcohol, a halogenated solvent, a catalyst, and the non-chlorinated perfluoroalkylalkysilane.

Clause 29: The method of clause 28, wherein the alcohol is selected from the group consisting of methanol, ethanol, propanol, and butanol, preferably ethanol.

Clause 30: The method of clauses 28 or 29, wherein the halogenated solvent comprises a hydrofluoroether, preferably pentane,1,1,1,2,2,3,4,5,5,5-decafluoro-3-methoxy-4-(trifluoromethyl)-.

Clause 31: The method of clauses 28 to 30, wherein the catalyst comprises a monoprotic acid or a polyprotic acid, preferably hydrochloric acid.

Clause 32: The method of any of clauses 28 to 31, wherein the non-chlorinated perfluoroalkylakylsilane has the general formula $(R^1_nR^2)_mSiX_{4-m}$, where $R^1$ is a perfluoroalkyl moiety having the general formula $C_qF_{2q+1}$, $R^2$ is a bisubstituted organic radical having the general formula $.(C_8H_{2s}).$; and X is one or more hydrolyzable moieties selected from acyloxy and/or alkoxy moieties, wherein m is in the range of 1 to 3, n is in the range of 1 to 3, s is in the range of 2 to 10, and q is in the range of 2 to 8.

Clause 33: The method of clause 32, wherein c is in the range of 3 to 7, preferably 4 to 6, more preferably 6.

Clause 34: The method of clauses 32 or 33, wherein q is 6, $R^2$ is ethyl, m is 1, and X is ethoxy.

Clause 35: The method of any of clauses 28 to 34, wherein the alcohol is in the range of 75 to 95 weight percent, such as 80 to 90 weight percent, such as 80 to 85 weight percent, preferably 82 to 85 weight percent, more preferably 83 to 84 weight percent, based on the total weight of the coating composition.

Clause 36: The method of any of clauses 28 to 35, wherein the catalyst is in the range of 2 to 8 weight percent, such as 2 to 7 weight percent, such as 3 to 6 weight percent, preferably 4 to 6 weight percent, more preferably 4 to 5 weight percent, based on the total weight of the coating composition.

Clause 37: The method of any of clauses 28 to 36, wherein the halogenated solvent is in the range of 5 to 15 weight percent, such as 6 to 12 weight percent, such as 8 to 12 weight percent, preferably 9 to 11 weight percent, more preferably 9 to 10 weight percent, based on the total weight of the coating composition.

Clause 38: The method of any of clauses 28 to 37, wherein the non-chlorinated perfluoroalkylalkysilane is in the range of 0.5 to 7 weight percent, such as 1 to 6 weight percent, such as 1 to 5 weight percent, preferably 1 to 3 weight percent, more preferably 1 to 2 weight percent, based on the total weight of the coating composition.

Clause 39: The method of any of clauses 28 to 38, wherein the coating composition comprises a first container comprising the alcohol and the catalyst and a second container comprising the halogenated solvent and the non-chlorinated perfluoroalkylalkysilane.

Clause 40: The method of clause 30, wherein in the first container, the alcohol is present in the range of 70 to 99 weight percent, such as 76 to 99 weight percent, such as 80 to 99 weight percent, preferably 90 to 99 weight percent, more preferably 94 to 95 weight percent, based on the total weight of the components in the first container.

Clause 41: The method of clauses 39 or 40, wherein in the first container, the catalyst is present in the range of 1 to 10 weight percent, such as 1 to $ weight percent, such as 2 to 7 weight percent, preferably 3 to 6 weight percent, more preferably 5 to 6 weight percent, based on the total weight of the components in the first container.

Clause 42: The method of any of clauses 30 to 41, wherein in the second container, the halogenated solvent is present in the range of 70 to 90 weight percent, such as 75 to 90 weight percent, such as 75 to 85 weight percent, preferably 80 to 85 weight percent, more preferably 83 to 84 weight percent, based on the total weight of the components in the second container.

Clause 43: The method of any of clauses 39 to 42, wherein in the second container, the non-chlorinated perfluoroalkylalkysilane is present in the range of 10 to 20 weight percent, such as 11 to 19 weight percent, such as 12 to 18 weight percent, preferably 14 to 17 weight percent, more preferably 16 to 17 weight percent, based on the total weight of the components in the second container.

Clause 44: The method of any of clauses 39 to 43, including an integral primer selected from a hydrolyzable silane or siloxane.

Clause 45: The method of clause 1, wherein the water repellant coating composition comprises an alcohol, a non-halogenated silanol-terminated polyorganosiloxane, a catalyst, and a siloxane bond-forming crosslinking agent.

Clause 46: The method of clause 45, wherein the alcohol is selected from the group consisting of methanol, ethanol, propanol, and butanol, preferably ethanol.

Clause 47: The method of clauses 45 or 46, wherein the non-halogenated polyorganosiloxane comprises a silanol-terminated polydialkylsiloxane.

Clause 48: The method of clause 47, wherein the silanol-terminated polyorganosiloxane comprises a silanol-terminated polydimethylsiloxane having the general formula $HOSi(CH_3)_2O[Si(CH_3)_2O]_mSi(CH_3)_2OH$, where m is in the range of 5 to 20, preferably in the range of 7 to 18.

Clause 49: The method of any of clauses 45 to 48, wherein the siloxane bond-forming crosslinking agent is selected from the group consisting of polydiethoxysilane, tetramethoxysilane, tetraethoxysilane, methyltriethoxysilane, and tetra-n-propoxysilane, preferably tetraethoxysilane.

Clause 50: The method of any of clauses 45 to 49, wherein the catalyst comprises a monoprotic acid or a polyprotic add, preferably sulfuric acid.

Clause 51: The method of any of clauses 45 to 50, wherein the alcohol is in the range of 80 to 90 weight percent, such as 85 to 99 weight percent, such as 90 to 99 weight percent, preferably 95 to 98 weight percent, more preferably 96 to 97 weight percent, based on the total weight of the coating composition.

Clause 52: The method of any of clauses 45 to 51, wherein the catalyst is in the range of 0.1 to 5 weight percent, such as 0.2 to 2 weight percent, such as 0.5 to 1 weight percent, preferably 0.7 to 0.8 weight percent, more preferably 0.75 to 0.77 weight percent, based on the total weight of the coating composition.

Clause 53: The method of any of clauses 45 to 52, wherein the silanol-terminated polyorganosiloxane is in the range of 1 to 10 weight percent, such as 1 to 5 weight percent, such as 1.5 to 4 weight percent, preferably 2 to 3 weight percent, more preferably 2 to 2.5 weight percent, based on the total weight of the coating composition.

Clause 54: The method of any of clauses 45 to 53, wherein the siloxane bond-forming crosslinking agent is in the range of 0.01 to 1 weight percent, such as 0.05 to 0.8 weight percent, such as 0.1 to 0.5 weight percent, preferably 0.2 to 0.4 weight percent, more preferably 0.2 to 0.3 weight percent, based on the total weight of the coating composition.

Clause 55: The method of any of clauses 45 to 54, wherein the coating composition comprises a first container comprising the silanol-terminated polyorganosiloxane and the siloxane bond-forming crosslinking agent, and a second container comprising the alcohol and the acid.

Clause 56: The method of clause 55, wherein in the first container, the silanol-terminated polyorganosiloxane is in the range of 75 to 95 weight percent, such as 80 to 95 weight percent, such as 85 to 95 weight percent, preferably 86 to 90 weight percent, more preferably 88 to 89 weight percent, based on the total weight of the components in the first container.

Clause 57: The method of clauses 55 or 56, wherein in the first container, the siloxane bond-forming crosslinking agent is in the range of 5 to 20 weight percent, such as 8 to 15 weight percent, such as 0 to 13 weight percent, preferably 10 to 12 weight percent, more preferably 11 to 12 weight percent, based on the total weight of the components in the first container.

Clause 58: The method of any of clauses 55 to 57, wherein in the second container, the alcohol is in the range of 97 to 99.9 weight percent, such as 97.5 to 90.9 weight percent, such as 98 to 99.9 weight percent, preferably 98.5 to 99.9 weight percent, more preferably 98.5 to 99.5 weight percent, based on the total weight of the components in the second container.

Clause 59: The method of any of clauses 55 to 58, wherein in the second container the catalyst is in the range of 0.1 to 3 weight percent, such as 0.5 to 1 weight percent, such as 0.6 to 0.9 weight percent, preferably 0.7 to 0.8 weight percent, more preferably 0.77 to 0.79 weight percent, based on the total weight of the components in the second container.

Clause 60: The method of any of clauses 28 to 59, including drying the water repellant coating composition at ambient conditions in the range of 30 minutes to 10 hours, such as 30 minutes to 8 hours, such as 30 minutes to 5 hours, preferably 1 hour to 3 hours, more preferably 2 hours.

Clause 61: The method of any of clauses 1 to 60, wherein the water repellant coating provides an initial water contact angle (sessile drop) of at least 60, such as at least 70, such as at least 80, such as at least 90, such as at least 100, preferably in the range of 90 to 120, more preferably in the range of 100 to 115.

Clause 62: The method of any of clauses 1 to 61, wherein the water repellant coating provides a water contact angle (sessile drop) of at least 60, such as at least 70, after 1000 hours exposure to a Cleveland Condensation Test (in accordance with ASTM D-4585-99), preferably at least 80, more preferably in the range of 80 to 90.

Clause 63: A treatment system for an aircraft transparency, comprising: a water repellant coating composition comprising at least one of a non-chlorinated perfluoroalkylalkysilane and a non-halogenated polyorganosiloxane.

Clause 64: The treatment system of clause 63, further comprising: a primer composition comprising an organic solvent and a silicon containing material.

Clause 65: The treatment system of clause 64, wherein the silicon material comprises a sane having the general formula SI, where X is a hydrolysable radical selected from halogens, alkoxy radicals, acyloxy radicals.

Clause 66: The treatment system of clause 65, wherein X is selected from chloro, bromo, iodo, methoxy, ethoxy, and acetoxy.

Clause 67: The treatment system of any of clauses 64 to 66, wherein the silicon material is selected from tetrachlorosilane, tetramethoxysilane, tetraethoxysilane, and tetraacetoxysilane, preferably tetrachlorosilane.

Clause 68: The treatment system of any of clauses 64 to 67, wherein the organic solvent of the primer composition comprises a halogenated hydrocarbon solvent.

Clause 69; The treatment system of any of clauses 64 to 68, wherein the organic solvent of the primer composition comprises a hydrofluoroether.

Cause 70: The treatment system of any of clauses 64 to 69, wherein the organic solvent of the primer composition comprises pentane,1,1,1,2,2,3,4,5,5,5-decafluoro-3-methoxy-4-(trifluoromethyl)-.

Clause 71: The treatment system of any of clauses 64 to 70, wherein the silicon material is present in the range of greater than 0 weight percent (wt. %) to 10 wt. %, preferably in the range of 0.1 wt. % to 5 wt. %, based on the total weight of the primer composition.

Clause 72: The treatment system of any of clauses 64 to 71, wherein the silicon material is present in the range of 0.5 wt. % to 1 wt. %, based on the total weight of the primer composition.

Clause 73: The treatment system of any of clauses 64 to 72, wherein the water repellant coating composition comprises an organic solvent and the non-chlorinated perfluoroalkylalkysilane.

Clause 74: The treatment system of clause 73, wherein the organic solvent of the water repellant coating composition comprises a halogenated solvent, such as a hydrofluoroether.

Clause 75: The treatment system of clauses 73 or 74, wherein the organic so/vent of the water repellant coating composition comprises pentane,1,1,1,2,2,3,4,5,5,5-decafluoro-3-methoxy-4-(trifluoromethyl)-.

Clause 76: The treatment system of any of clauses 64 to 76, wherein the non-chlorinated perfluoroalkylalkysilane has the general formula $(R^1{}_nR^2)_m SiX_{4-m}$, where $R^1$ is a perfluoroalkyl moiety having the general formula $C_qF_{2q+1}$; $R^2$ is a bisubstituted organic radical having the general formula $.(C_8H_{2s})_.$; and X is one or more hydrolyzable moieties selected from acyloxy and/or alkoxy moieties, wherein m is in the range of 1 to 3, n is in the range of 1 to 3, s is in the range of 2 to 10, and q is in the range of 2 to 8.

Clause 77: The treatment system of clause 76, wherein q is in the range of 3 to 7, preferably 4 to 6, more preferably 6.

Clause 78: The treatment system of clauses 76 or 77, wherein q is 6, $R^2$ is ethyl, m is 1, and X is ethoxy.

Clause 79: The treatment system of any of clauses 64 to 72, wherein the water repellant coating composition comprises a non-halogenated polyorganosiloxane and a siloxane bond-forming crosslinking agent.

Clause 80: The treatment system of clause 79, wherein the non-halogenated polyorganosiloxane comprises a silanol-terminated polydialkylsiloxane.

Clause 81: The method of clauses 79 or 80, wherein the polyorganosiloxane comprises a silanol-terminated polydimethylsiloxane having the general formula $HOSi(CH_3)_2O[Si(CH_3)_2O]_m Si(CH_3)_2OH$, where m is in the range of 5 to 20, preferably in the range of 7 to 18.

Clause 82: The treatment system of clauses 80 or 81, wherein the siloxane bond-forming crosslinking agent is selected from the group consisting of polydiethoxysilane, tetramethoxysilane, tetraethoxysilane, methyltriethoxysilane, and tetra-n-propoxysilane, preferably tetraethoxysilane.

A Cause 83: The treatment system of any or clauses 80 to 82, wherein the polyorganosiloxane is in the range of 80 to 99 weight percent, preferably 85 to 98 weight percent, based on the total weight of the water repellant coating composition.

Clause 84: The method of any of douses 80 to 83, wherein the siloxane bond-forming crosslinking agent is in the range of 1 to 5 weight percent, preferably 1 to 3 weight percent, based on the total weight of the water repellant coating composition.

Clause 85: The treatment system of clause 63, wherein the water repellant composition comprises an alcohol, a halogenated solvent, a catalyst, and the non-chlorinated perfluoroalkylakylsilane.

Clause 86: The treatment system of clause 85, wherein the alcohol is selected from the group consisting of methanol, ethanol, propanol, and butanol, preferably ethanol.

Clause 87: The treatment system of clauses 85 or 88, wherein the halogenated advent comprises a hydrofluoroether, preferably pentane,1,1,1,2,2,3,4,5,5,5-decafluoro-3-methoxy-4-(trifluoromethyl)-.

Clause 88: The treatment system of any of clauses 86 to 87, wherein the catalyst comprises a monoprotic add or a polyprotic add, preferably hydrochloric add.

Clause 89: The treatment system of any of clauses 85 to 88, wherein the non-chlorinated perfluoroalkylalkysilane has the general formula $(R^1{}_nR^2)_m SiX_{4-m}$, where $R^1$ is a perfluoroalkyl moiety having the general formula $C_qF_{2q+1}$; $R^2$ is a bisubstituted organic radical having the general formula $.(C_8H_{2s})_.$; and X is one or more hydrolyzable moieties selected from acyloxy and/or alkoxy moieties, wherein m is in the range of 1 to 3, n is in the range of 1 to 3, s is in the range of 2 to 10, and q is in the range of 2 to 8.

Clause 90: The treatment system of clause 89, wherein q is in the range of 3 to 7, preferably 4 to 6, more preferably 6.

Clause 91: The treatment system of clauses 89 or 90, wherein q is 6, $R^2$ is ethyl, m is 1, and X is ethoxy.

Clause 92: The treatment system of any of clauses 86 to 91, wherein the alcohol is in the range of 75 to 95 weight percent, such as 80 to 90 weight percent, such as 80 to 85 weight percent, preferably 82 to 85 weight percent, more preferably 83 to 84 weight percent, based on the total weight of the coating composition.

Clause 93: The treatment system of any of clauses 85 to 92, wherein the catalyst is in the range of 2 to 8 weight percent, such as 2 to 7 weight percent, such as 3 to 6 weight percent, preferably 4 to 6 weight percent, more preferably 4 to 5 weight percent, based on the total weight of the coating composition.

Clause 94: The treatment system of any of clauses 85 to 93, wherein the halogenated solvent is be in the range of 5 to 15 weight percent, such as 6 to 12 weight percent, such as 8 to 12 weight percent, preferably 9 to 11 weight percent, more preferably 9 to 10 weight percent, based on the total weight of the coating composition.

Clause 95: The treatment system of any of clauses 85 to 94, wherein the non-chlorinated perfluoroalkylakylsilane is in the range of 0.5 to 7 weight percent, such as 1 to 6 weight percent, such as 1 to 5 weight percent, preferably 1 to 3 weight percent, more preferably 1 to 2 weight percent, based on the total weight of the coating composition.

Clause 96: The treatment system of any of clauses 85 to 95, wherein the coating composition comprises a first container comprising the alcohol and the catalyst and a second container comprising the halogenated solvent and the non-chlorinated perfluoroalkylalkysilane.

Clause 97: The treatment system of clause 96, wherein in the first container, the alcohol is present in the range of 70 to 99 weight percent, such as 75 to 99 weight percent, such as 80 to 99 weight percent, preferably 90 to 99 weight percent, more preferably 94 to 95 weight percent, based on the total weight of the components in the first container.

Clause 98: The method of clauses 96 or 97, wherein in the first container, the catalyst is present in the range of 1 to 10 weight percent, such as 1 to 8 weight percent, such as 2 to 7 weight percent, preferably 3 to 6 weight percent, more preferably 5 to 6 weight percent, based on the total weight of the components in the first container.

Clause 99: The treatment system of any of clauses 96 to 98, wherein in the second container, the halogenated solvent is present in the range of 70 to 90 weight percent, such as 75 to 90 weight percent, such as 75 to 85 weight percent, preferably 80 to 85 weight percent, more preferably 83 to 84 weight percent, based on the total weight of the components in the second container.

Clause 100: The treatment system of any of clauses 96 to 99, wherein in the second container, the alkoxysilane is present in the range of 10 to 20 weight percent, such as 11 to 19 weight percent, such as 12 to 18 weight percent, preferably 14 to 17 weight percent, more preferably 16 to 17 weight percent, based on the total weight of the components in the second container.

Clause 101: The treatment system of any of clauses 96 to 100, including an integral primer selected from a hydrolyzable sane or siloxane.

Clause 102: The treatment system of clause 63, wherein the water repellant coating composition comprises an alcohol, a non-halogenated silanol-terminated polyorganosiloxane, a catalyst, and a siloxane bond-forming crosslinking agent.

Clause 103: The treatment system of clause 102, wherein the alcohol is selected from the group consisting of methanol, ethanol, propanol, and butanol, preferably ethanol.

Clause 104: The treatment system of clauses 102 or 103, wherein the non-halogenated polyorganosiloxane comprises a silanol-terminated polydialkylsiloxane.

Clause 105: The treatment system of clause 104, wherein the silanol-terminated polyorganosiloxane comprises a silanol-terminated polydimethylsiloxane having the general formula $HOSi(CH_3)_2O[Si(CH_3)_2O]_mSi(CH_3)_2OH$, were m is in the range of 5 to 20, preferably in the range of 7 to 18.

Clause 106: The treatment system of any of clauses 102 to 105, wherein the siloxane bond-forming crosslinking agent is selected from the group consisting of polydiethoxysilane, tetramethoxysilane, tetraethoxysilane, methyltriethoxysilane, and tetra-n-propoxysilane, preferably tetraethoxysilane.

Clause 107: The treatment system of any of clauses 102 to 106, wherein the catalyst comprises a monoprotic acid or a polyprotic acid, preferably sulfuric acid.

Clause 108: The treatment system of any of clauses 102 to 107, wherein the alcohol is in the range of 80 to 99 weight percent, such as 85 to 99 weight percent, such as 90 to 99 weight percent, preferably 95 to 98 weight percent, more preferably 96 to 97 weight percent, based on the total weight of the coating composition.

Clause 109: The treatment system of any of clauses 102 to 108, wherein the catalyst is in the range of 0.1 to 5 weight percent, such as 0.2 to 2 weight percent, such as 0.5 to 1 weight percent, preferably 0.7 to 0.8 weight percent, more preferably 0.75 to 0.77 weight percent, based on the total weight of the coating composition.

Clause 110: The treatment system of any of clauses 102 to 109, wherein the silanol-terminated polyorganosiloxane is in the range of 1 to 10 weight percent, such as 1 to 5 weight percent, such as 1.5 to 4 weight percent, preferably 2 to 3 weight percent, more preferably 2 to 2.5 weight percent, based on the total weight of the coating composition.

Clause 111: The treatment system of any of clauses 102 to 110, wherein the siloxane bond-forming crosslinking agent is in the range of 0.01 to 1 weight percent, such as 0.05 to 0.8 weight percent, such as 0.1 to 0.5 weight percent, preferably 0.2 to 0.4 weight percent, more preferably 0.2 to 0.3 weight percent, based on the total weight of the coating composition.

Clause 112: The treatment system of any of clauses 102 to 111, wherein the coating composition comprises a first container comprising the silanol-terminated polyorganosiloxane and the siloxane bond-forming crosslinking agent, and a second container comprising the alcohol and the acid.

Clause 113: The treatment system of clause 112, wherein in the first container the silanol-terminated polyorganosiloxane is in the range of 75 to 05 weight percent, such as 80 to 95 weight percent, such as 85 to 95 weight percent, preferably 86 to 90 weight percent, more preferably 88 to 89 weight percent, based on the total weight of the components in the first container.

Clause 114: The treatment system of clauses 112 or 113, wherein in the first container the siloxane bond-forming crosslinking agent is in the range of 5 to 20 weight percent, such as 8 to 15 weight percent, such as 9 to 13 weight percent, preferably 10 to 12 weight percent, more preferably 11 to 12 weight percent, based on the total weight of the components in the first container.

Clause 115: The treatment system of any of clauses 112 to 114, wherein in the second container, the alcohol is in the range of 97 to 99.9 weight percent, such as 97.5 to 99.9 weight percent, such as 98 to 99.9 weight percent, preferably 98.5 to 99.9 weight percent, more preferably 98.5 to 99.5 weight percent, based on the total weight of the components in the second container.

Clause 116: The treatment system of any of clauses 112 to 115, wherein in the second container the catalyst is in the range of 0.1 to 3 weight percent, such as 0.5 to 1 weight percent, such as 0.6 to 0.9 weight percent, preferably 0.7 to 0.8 weight percent, more preferably 0.77 to 0.79 weight percent, based on the total weight of the components in the second container.

Clause 117: The treatment system of any of clauses 63 to 116, wherein the water repellant coating provides an initial water contact angle (sessile drop) of at least 60, such as at least 70, such as at least 80, such as at least 90, such as at least 100, preferably in the range of 90 to 120, more preferably in the range of 100 to 115.

Clause 118: The treatment system of any of clauses 63 to 117, wherein the water repellant coating provides a water contact angle (sessile drop) of at least 60, such as at least 70, after 1000 hours exposure to a Cleveland Condensation Test (in accordance with ASTM D-4585-99), for example at least 80, preferably in the range of 80 to 90.

EXAMPLES

The invention will be further understood from the descriptions of specific examples which follow. In the following examples, the glass substrates were cleaned with a 50/50 volume percent solution of isopropyl alcohol in deionized water, polished with a cerox aqueous solution, wiped dry, rinsed with double deionized water, and wiped dry again. Ambient conditions were a temperature in the range of 18° C. to 24° C. and relative humidity in the range of 40% to 60%. As noted in the following examples, the substrates were either annealed glass or antistatic glass. By "annealed glass" is meant conventional annealed float glass, such as is commercially available from PPG industries, Inc. By "antistatic glass" is meant glass having a metal oxide antistatic coating.

Example 1 (Two Step Process)

The primer composition was wiped onto the cleaned substrate using a cotton swab. The primer composition comprised 99.14 wt. % pentane,1,1,1,2,2,3,4,5,5,5-decafluoro-3-methoxy-4-(trifluoromethyl)- and 0.86 wt. % tetrachlorosilane. The primer composition was dried at ambient conditions for five minutes.

The water repellant composition was wiped onto the primed substrate with a cotton swab. The water repellant composition comprised 97.83 wt. % pentane,1,1,1,2,2,3,4,5,5,5-decafluoro-3-methoxy-4-(trifluoromethyl)- and 2.17 wt. % triethoxy(3,3,4,4,5,5,6,6,7,7,8,8,8-tridecafluorooctyl)silane. The water repellant composition was dried at ambient conditions for one hour and then heat cured in an oven at 150° F. (65.5° C.) for 8 hours.

Condensing Humidity Resistance Test (CCC)

Figure 1:
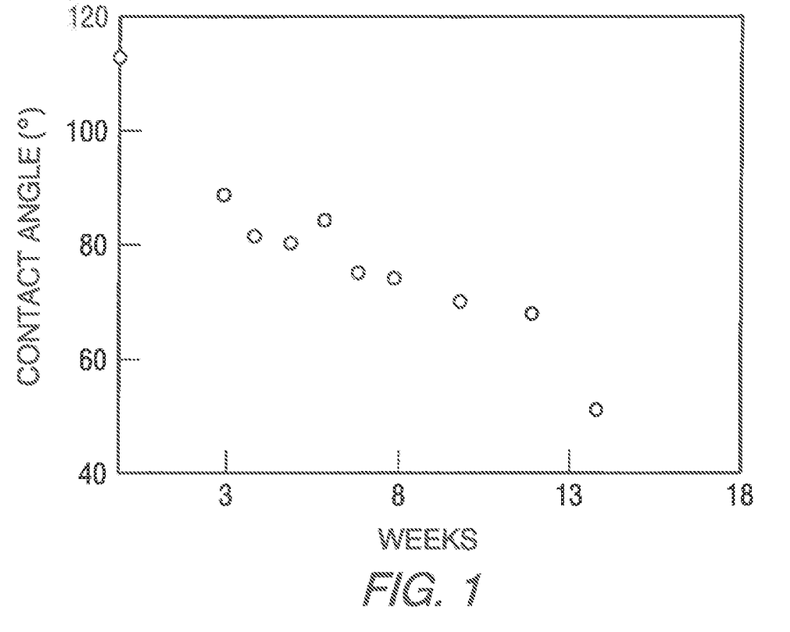
FIG. 1 is a graph of contact angle versus weeks for the condensing humidity resistance (CCC) test of Example 1 on annealed glass.
Figure 3:
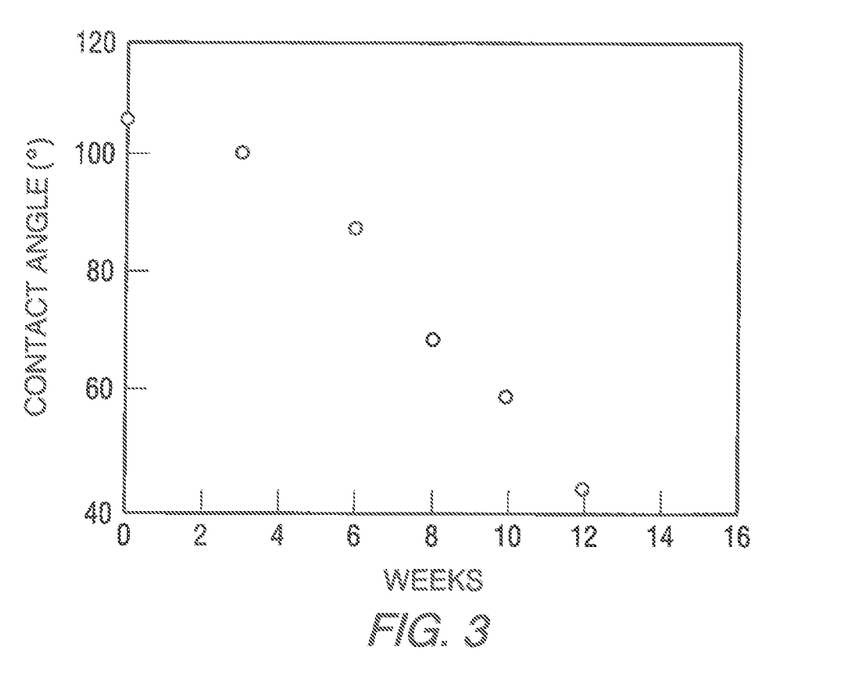
FIG. 3 is a graph of contact angle versus weeks for the condensing humidity resistance (CCC) test of Example 1 on antistatic glass.

This test was conducted in accordance with ASTM D4585-99. Two inch by six inch (5 cm by 15 cm) samples were placed as the was of an elevated temperature and humidity chamber. As a result of the 122° F. (50° C.) and 100% relative humidity on the coated side and ambient indoor temperature and humidity on the exterior side of the sample, water vapor continuously condensed on the coated surface. Four contact angles from each of the two coupons were averaged at each inspection. FIGS. 1 and 3 show the results of this test. In FIG. 1, the substrates were annealed glass. In FIG. 3, the substrates were antistatic glass.

Cyclic UV Light/Humidity Resistance (QUVB313)

Figure 2:
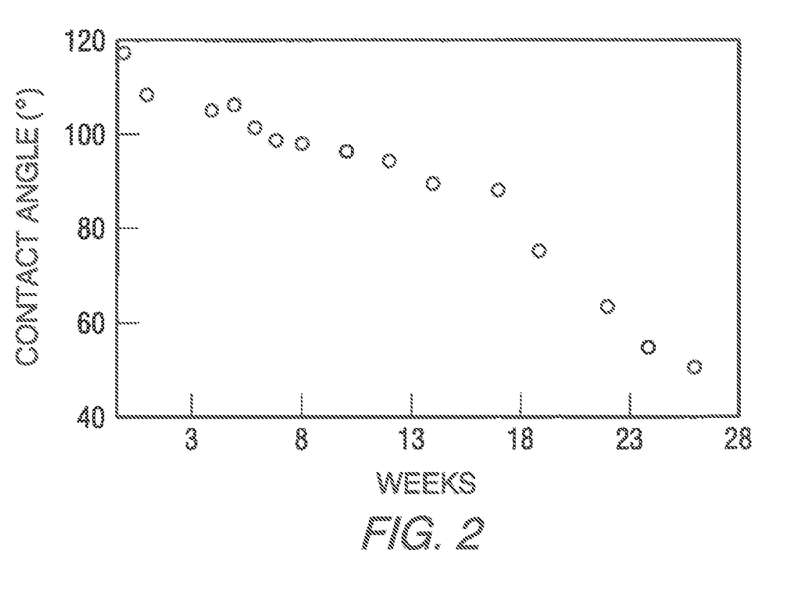
FIG. 2 is a graph of contact angle versus weeks for the QUVB313 test of Example 1 on annealed glass.
Figure 4:
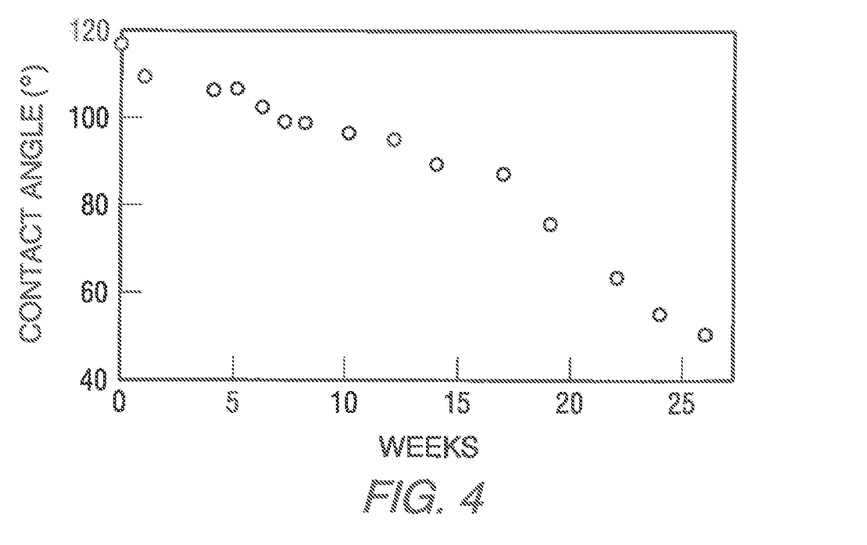
FIG. 4 is a graph of contact angle versus weeks for the QUVB313 test of Example 1 on antistatic glass.

This test was conducted in accordance with ASTM G-53-96. Three inch by four inch (7.6 cm by 10 cm) glass samples were placed with the coated surface on the inside of the chamber. The chamber contained a UVB 313 fluorescent lamp. The fluorescent lamps showed a peak output at 313 nm, which tailed to negligible light output at 275 nm and 380 nm. The cycle comprised 8 hours of dry UV light at a black panel temperature of 60° C. followed by 4 hours of dark, most atmosphere exposure at an air temperature of 50° C. Two coupons were coated, FIGS. 2 and 4 illustrate the results of this test. In FIG. 2, the substrates were annealed glass. In FIG. 4, the substrates were antistatic glass.

Wiper Abrasion Resistance Test

This test was conducted using a Model D12V Washability Tester (from Paul N. Gardner Company, Inc. of Pompano Beach, Fla.). Two 1.25 inch rubber wiper blade sections (cut from ANCO twenty-two inch universal refills) and spaced two inches apart were oscillated on the coated surface with a wiper block weight of 460 grams on both blades. Deionized water at a flow rate of 150 ml per minute was added in front and in back of the wiper block. The results are listed in Table 1 below.

TABLE 1

| # cycles | Contact Angle (°) |
| --- | --- |
| 0 | 110 |
| 5,000 | 102 |
| 10,000 | 98 |
| 20,000 | 93 |
| 30,000 | 85 |
| 40,000 | 83 |
| 50,000 | 68 |
| 60,000 | 62 |
| 70,000 | 63 |
| 80,000 | 57 |

Example 2 (One Step Process)

In this Example, the water repellant coating composition was applied onto the cleaned substrate without first priming the substrate as described above.

The water repellant composition was wiped onto the substrate with a cotton swab. The water repellant composition comprised 83.34 wt. % ethanol, 4.90 wt. % 0.5M HCl, 9.80 wt. % pentane,1,1,1,2,2,3,4,5,5,5-decafluoro-3-methoxy-4-(trifluoromethyl)-, and 1.96 wt. % triethoxy(3,3,4,4,5,5,6,6,7,7,8,8,8-tridecafluorooctyl)silane. The water repellant composition was dried at ambient conditions for two hours.

Condensing Humidity Resistance Test (CCC)

Figure 5:
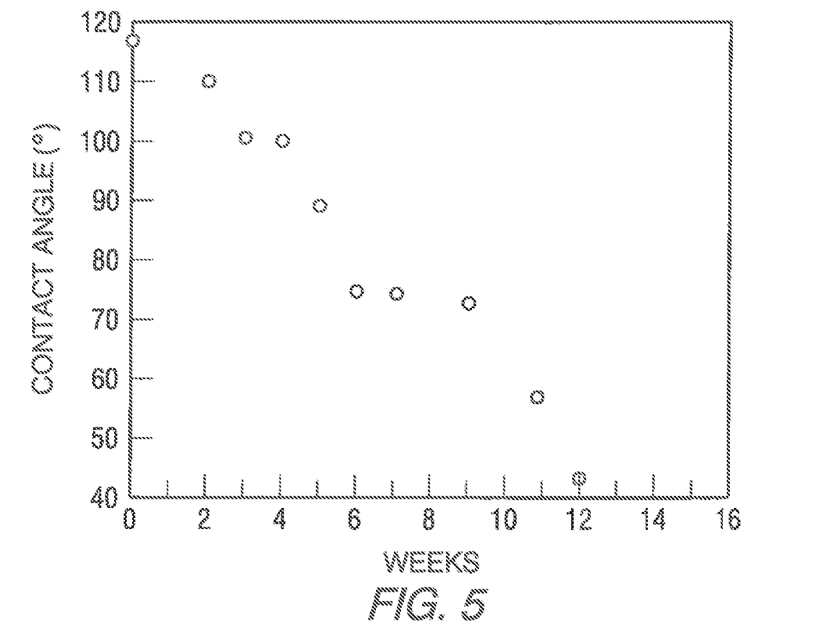
FIG. 5 is a graph of contact angle versus weeks for the condensing humidity resistance (CCC) test of Example 2 on antistatic glass.

This test was conducted in accordance with ASTM D-4585-99. Two inch by six inch (5 cm by 15 cm) samples were placed as the was of an elevated temperature and humidity chamber. As a result of the 122° F. (50° C.) and 100% relative humidity on the coated side and ambient indoor temperature and humidity on the exterior side of the sample, water vapor continuously condensed on the coated surface. Four contact angles from each of the two coupons were averaged at each inspection. FIG. 8 illustrates the results of this test. The substrates were antistatic glass.

Cyclic UV Light/Humidity Resistance (QUVB313)

Figure 6:
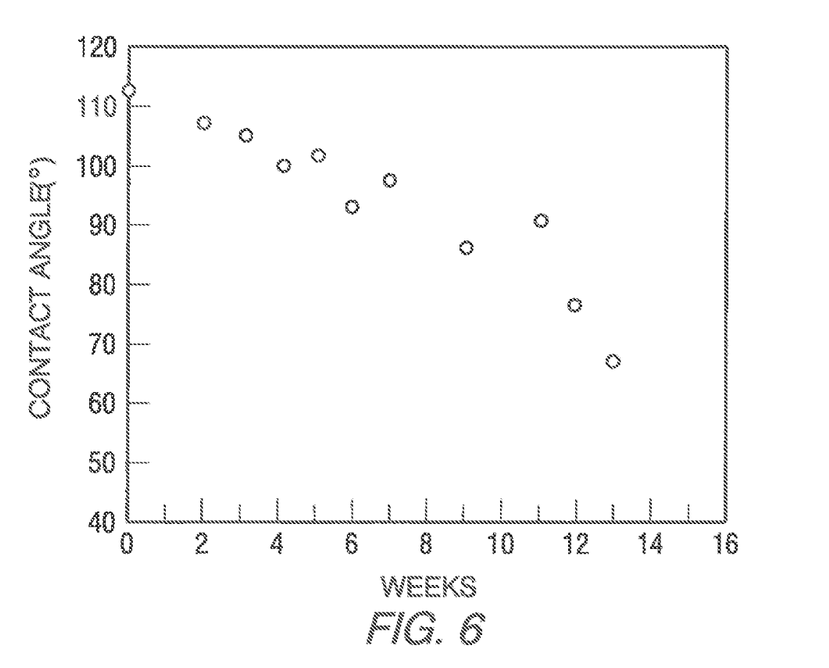
FIG. 6 is a graph of contact angle versus weeks for the QUVB313 test of Example 2 on antistatic glass.

This test was conducted in accordance with ASTM G-53-96, Three inch by four inch (7.6 cm by 10 cm) glass samples were placed with the coated surface on the inside of the chamber. The chamber contained a UVB 313 fluorescent lamp. The fluorescent lamps showed a peak output at 313 nm, which tailed to negligible light output at 275 nm and 380 nm. The cycle comprised 8 hours of dry UV light at a black panel temperature of 60° C. followed by 4 hours of dark, moist atmosphere exposure at an air temperature of 50° C. Two coupons were coated. FIG. 6 illustrates the results of this test. The substrates were antistatic glass.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A method of treating an aircraft transparency, comprising:
   applying a water repellant coating composition over a surface of an aircraft transparency substrate, the water repellant coating composition comprising 80 to 99 weight percent of a non-halogenated polyorganosiloxane, and
   heating the water repellant coating composition to form a water repellant coating,
   wherein the water repellant coating composition comprises an organic solvent comprising a hydrofluoroether.

2. The method of claim 1, including:
   applying a primer composition comprising an organic solvent and a silicon material over the aircraft transparency substrate to form a primed substrate surface; and
   applying the water repellant coating composition over the primed substrate surface.

3. The method of claim 2, wherein the silicon material is selected from the group consisting of tetrachlorosilane, tetramethoxysilane, tetraethoxysilane, and tetraacetoxysilane.

4. The method of claim 2, wherein the organic solvent of the primer composition comprises a hydrofluoroether.

5. The method of claim 2, wherein the water repellant coating composition comprises a non-chlorinated perfluoroalkylalkylsilane.

6. The method of claim 5, wherein the non-chlorinated perfluoroalkylalkylsilane has the general formula $(R^1{}_nR^2)_m SiX_{4-m}$, where $R^1$ is a perfluoroalkyl moiety having the general formula $C_qF_{2q+1}$; $R^2$ is a bisubstituted organic radical having the general formula $\cdot(C_sH_{2s})\cdot$; and X is one or more hydrolyzable moieties selected from acyloxy and/or alkoxy moieties, wherein m is in the range of 1 to 3, n is in the range of 1 to 3, s is in the range of 2 to 8, and q is in the range of 3 to 7.

7. The method of claim 6, wherein n is 1, q is 6, $R^2$ is ethyl, m is 1, and X is ethoxy.

8. The method of claim 2, wherein the water repellant coating composition comprises a siloxane bond-forming crosslinking agent.

9. The method of claim 1, wherein the non-halogenated polyorganosiloxane comprises a silanol-terminated polydialkylsiloxane having the general formula $HOSi(CH_3)_2O[Si(CH_3)_2O]_mSi(CH_3)_2OH$, where m is in the range of 5 to 20.

10. The method of claim 8, wherein the siloxane bond-forming crosslinking agent is selected from the group consisting of polydiethoxysilane, tetramethoxysilane, tetraethoxysilane, methyltriethoxysilane, and tetra-n-propoxysilane.

11. The method of claim 1, wherein the water repellant coating composition comprises an alcohol, a catalyst, and a non-chlorinated perfluoalkylalkylsilane.

12. The method of claim 11, wherein the alcohol is selected from the group consisting of methanol, ethanol, propanol, and butanol, wherein the organic solvent comprises a hydrofluoroether, wherein the catalyst comprises hydrochloric acid, and wherein the non-chlorinated perfluoroalkylalkylsilane has the general formula $(R^1{}_nR^2)_mSiX_{4-m}$, where $R^1$ is a perfluoroalkyl moiety having the general formula $C_qF_{2q+1}$; $R^2$ is a bisubstituted organic radical having the general formula $\cdot(C_sH_{2s})\cdot$; and X is one or more hydrolyzable moieties selected from acyloxy and/or alkoxy moieties, wherein m is in the range of 1 to 3, n is in the range of 1 to 3, s is in the range of 2 to 8, and q is in the range of 3 to 7.

13. The method of claim 11, wherein the coating composition comprises a first container comprising the alcohol and the catalyst, and a second container comprising the halogenated solvent and the non-chlorinated perfluoalkylalkylsilane.

14. The method of claim 1, wherein the water repellant coating composition comprises an alcohol, the non-halogenated polyorganosiloxane, a catalyst, and a siloxane bond-forming crosslinking agent.

15. The method of claim 14, wherein the non-halogenated polyorganosiloxane comprises a silanol-terminated polydialkylsiloxane having the general formula $HOSi(CH_3)_2O[Si(CH_3)_2O]_mSi(CH_3)_2OH$, where m is in the range of 5 to 20, and wherein the siloxane bond-forming crosslinking agent is selected from the group consisting of polydiethoxysilane, tetramethoxysilane, tetraethoxysilane, methyltriethoxysilane, and tetra-n-propoxysilane.

16. A method of treating an aircraft transparency, comprising:
applying a primer composition comprising an organic solvent and a silicon material over the aircraft transparency substrate to form a primed substrate surface, wherein the silicon material is selected from the group consisting of tetrachlorosilane, tetramethoxysilane, tetraethoxysilane, and tetraacetoxysilane, and wherein the organic solvent of the primer composition comprises a hydrofluoroether comprising 1,1,1,2,2,3,4,5,5,5-decafluoro-3-methoxy-4-(trifluoromethyl)-pentane;
drying the primer composition under ambient conditions in the range of 1 minute to 10 minutes;
applying a water repellant coating composition over the primed substrate surface, wherein the water repellant coating composition comprises an alcohol in an amount of 75 to 95 weight percent, a halogenated solvent, a catalyst, and a non-chlorinated perfluoroalkylalkylsilane;
drying the water repellant coating composition under ambient conditions in the range of 1 minute to 10 minutes; and
heating the water repellant coating composition to a temperature in the range of 52° C. to 149° C. for 5 hours to 10 hours to form a water repellant coating.

17. The method of claim 16, wherein the non-chlorinated perfluoroalkylalkylsilane has the general formula $(R^1{}_nR^2)_mSiX_{4-m}$, where $R^1$ is a perfluoroalkyl moiety having the general formula $C_qF_{2q+1}$; $R^2$ is a bisubstituted organic radical having the general formula $\cdot(C_sH_{2s})\cdot$; and X is one or more hydrolyzable moieties selected from acyloxy and/or alkoxy moieties, wherein m is in the range of 1 to 3, n is in the range of 1 to 3, s is in the range of 2 to 8, and q in the range of 3 to 7.

18. The method of claim 17, wherein q is 6, $R^2$ is ethyl, m is 1, and X is ethoxy.

19. A treatment system for an aircraft transparency, comprising:
a first container comprising a first mixture comprising:
an alcohol selected from the group consisting of methanol, ethanol, propanol, and butanol; and
a catalyst comprising hydrochloric acid; and
a separate second container comprising a second mixture different from the first mixture, the second mixture comprising:
5 to 15 weight percent of a halogenated solvent comprising a hydrofluoroether; and
a non-chlorinated perfluoalkylalkylsilane, wherein the non-chlorinated perfluoroalkylalkylsilane has the general formula $(R^1{}_nR^2)_mSiX_{4-m}$, where $R^1$ is a perfluoroalkyl moiety having the general formula $C_qF_{2q+1}$; $R^2$ is a bisubstituted organic radical having the general formula $\cdot(C_sH_{2s})\cdot$; and X is one or more hydrolyzable moieties selected from acyloxy and/or alkoxy moieties, wherein m is in the range of 1 to 3, n is in the range of 1 to 3, s is in the range of 2 to 8, and q in the range of 3 to 7.

20. The treatment system of claim 19, wherein:
the first container consists essentially of the alcohol and the catalyst; and
the second container consists essentially of the halogenated solvent and the non-chlorinated perfluoalkylalkylsilane.

* * * * *